340-870.12 SR
XR 2,496,148
1
Jan. 31, 1950 R. S. BUTTS 2,496,148
FREQUENCY MODULATOR AND TIME
DIVISION MULTIPLEX SYSTEM
Filed Sept. 29, 1948
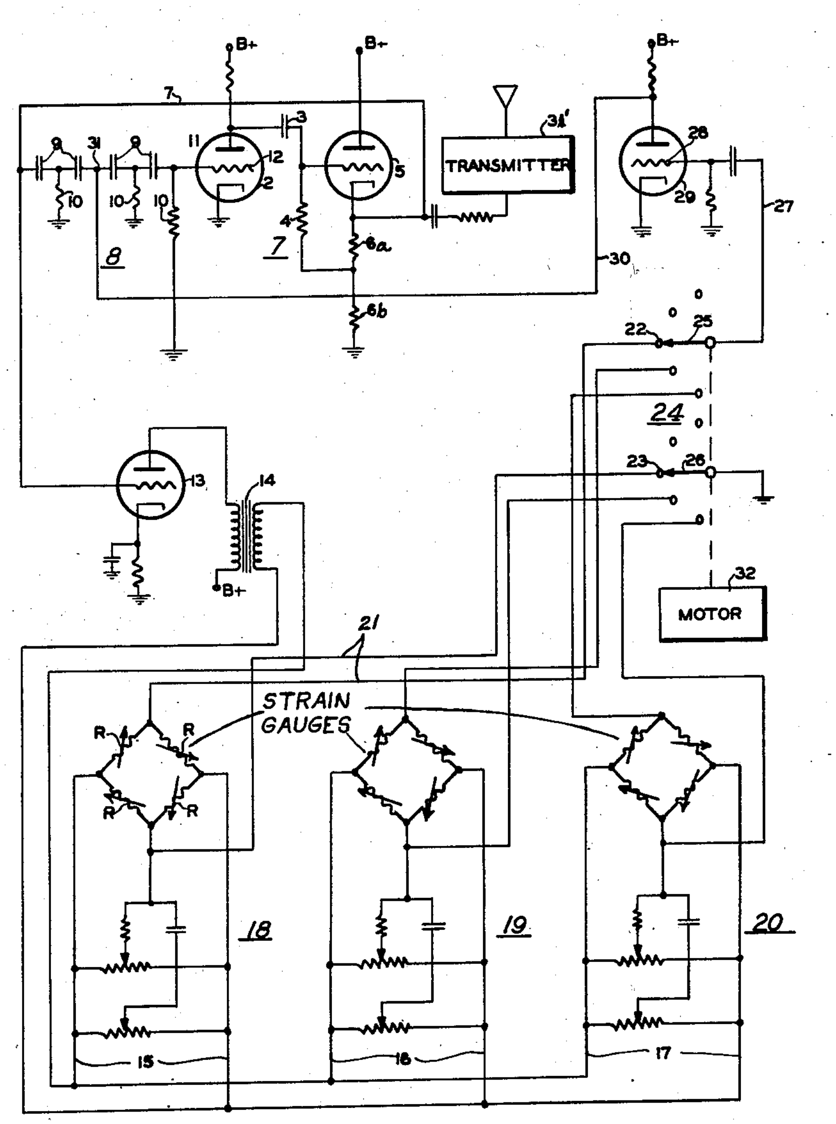
INVENTOR.
ROBERT S. BUTTS
BY
Hyman Hurwitz
ATTORNEY Patented Jan. 31, 1950 2,496,148

UNITED STATES PATENT OFFICE 2,496,148

FREQUENCY MODULATOR AND TIME DIVISION MULTIPLEX SYSTEM

Robert S. Butts, Arlington, Va., assignor to Melpar, Inc., Alexandria, Va.

Application September 29, 1948, Serial No. 51,674

9 Claims. (Cl. 177—351)

The present invention relates to time division multiplex signaling systems for transmitting a plurality of independent electric signals on a single carrier wave, and particularly to time division multiplex signaling systems for signals corresponding with measurements accomplished in a plurality of telemetric channels.

The present invention involves the transmission of signals in the form of a series of pulses, the pulses corresponding respectively to the different channels being transmitted successively in time, so that a group of pulses comprising one pulse from each of the telemetric channels is transmitted before a succeeding similar group is transmitted. Receiving stations adapted to co-operate with telemetric time division multiplex transmitters of the type herein disclosed are provided with means for separating the pulses of each group, so that pulses corresponding with each of the channels are passed independently to an appropriate demodulating and indicating or recording device, the pulses corresponding with other channels being similarly separated and similarly directed to corresponding recording or indicating devices.

Considered from another aspect the present invention involves the transmission of signals on a common carrier wave in the form of a series of pulsed frequency modulated sub-carriers. The transmission of the sub-carrier pulses corresponding to the different channels are displaced in time, so that a sub-carrier transmission from any one channel is caused to occur in a time period distinguishable from the time period allocated to a sub-carrier transmission corresponding with any other channel, within each time divided group.

Commutation of channels within the groups is accomplished in accordance with the present invention by means of a mechanical commutator. A single sub-carrier oscillator circuit is provided, which may be of the phase shift or R. C. type, and in which the anode or output circuit of the oscillator is coupled with the control grid or input circuit of the oscillator via a circuit comprising a plurality of condensers and resistances, which introduce a phase shift between the output and the input circuit of the oscillator. The oscillator normally oscillates at a frequency such that the amount of voltage phase shift between the output and the input circuits equals 180°, and accordingly the frequency of the oscillator may be varied by varying the phase of the fed back signal.

In accordance with the present invention, output signal derived from the oscillator is applied in parallel to a series of strain gauges, in the form of balanced bridges, which, in their balanced conditions, transfer no signal at oscillator frequency, but which, in response to unbalance, transfer signals at oscillator frequency which correspond in amplitude to the extent of unbalance. Output signal derived from each strain gauge is applied to the input circuit of the R. C. oscillator in such manner as to combine with the normal feed back signal, but in out of phase relation thereto. Accordingly, the total voltage applied to the input circuit of the R. C. oscillator, comprising the normal feed back signal, and a further feed back signal deriving through the strain gauge, has a resultant phase determined by the amplitude of the feed back voltage provided by the strain gauge. Since the oscillating frequency of the R. C. oscillator is determined by the phase of the total feed back voltage applied to the input circuit thereof, the feed back voltage introduced by the strain gauge effects a shift in the frequency of the R. C. oscillator, the shift in frequency being of such magnitude as to reestablish a 180° phase difference between the output and input voltages of the oscillator, and the phase of the total input voltage being compounded of the phase and amplitude of the normal feed back voltage deriving from the output of the oscillator, and applied to the input of the oscillator via the R. C. circuit, together with the phase and amplitude of a further feed back voltage which is applied via the strain gauge.

In order to accomplish time division of the channels within each group of signals, the separate strain gauges are connected in circuit with the R. C. oscillator in sequence, by means of a mechanically operating commutator.

It is a broad object of the invention to provide a novel time division multiplex telemetric transmitter It is another broad object of the invention to provide a novel telemetric transmitter adapted for the transmission of the values of a number of measured quantities in time divided channels, time division of the channels being accomplished by frequency modulating the output of an R. C. oscillator, in response successively to amplitude modulation of signals in each of the plurality of channels.

The true spirit and scope of the invention is defined in the appended claims. The invention itself is disclosed as incorporated in a specific embodiment thereof which is described in detail in the following specification, and illustrated in the accompanying single figure of the drawings.

Referring now more specifically to the drawings, the reference numeral 1 denotes generally and R. C. oscillator of known character, comprising a first electronic vacuum tube 2, the output of which is coupled via a coupling condenser 3 and a coupling resistor 4 to a further vacuum tube amplifier tube 5, having an output or load circuit comprising resistors 6a and 6b connected in series with the cathode circuit of the tube 5. Output voltages derived from across the output load 6a and 6b of the amplifier tube 5 are applied via a line 7, and a phase shift or R. C. network 8, to the input circuit of the vacuum tube amplifier 2. Phase shift or R. C. network 8 comprises a plurality of condensers 9 and resistors 10, the condensers being connected in series between the line 7 and the input circuit of the amplifier 2, and the resistors 10 being connected between the junction points of the condensers 9 and ground. The R. C. circuit comprising the condensers 9 and the resistors 10 introduces a phase shift between the voltage existing on the line 7 and that applied to the grid of the amplifier tube 2, and the oscillator 1 will oscillate at a frequency such that the phase shift introduced by the phase shift network 8 will produce voltage conditions in the amplifier tube 2 such that the alternating voltage on the anode 11 of the tube 2 will be precisely 180° out of phase with the alternating voltage applied to the control electrode 12 of the amplifier tube 2.

Oscillator circuits of the type herein described and illustrated are well known in the art of electronics, particular reference being made to Patent #2,361,658, issued to C. M. Sinnett on October 31, 1944, wherein is disclosed a phase shift oscillator which is provided with means for modulating the frequency of the oscillations produced by the oscillator.

The output of the oscillator 1, as derived from the line 7, is applied via an amplifying and isolating stage 13 and a coupling transformer 14 in parallel to the input circuits 15, 16 and 17, of the strain gauges 18, 19 and 20, respectively. All of the strain gauges are identical, and accordingly one only of these strain gauges will be described in detail, this description sufficing to describe likewise the remaining ones of the strain gauges.

Turning now to the strain gauge 18, the latter consists of a bridge circuit comprising four resistance elements R, two diagonally opposite terminals of the bridge circuit being connected to receive voltage applied by the transformer 14, and output being taken from the remaining two diagonally opposite terminals of the bridge circuit. One or all of the resistances R may be subjected to stress. The character of the stressed one of the resistances R may be such that in response to such stress a strain is set up in the resistance, which alters the physical dimensions thereof, and correspondingly varies the resistance thereof. Variation of the resistance of any one of the resistances R, from a value such that the bridge is balanced, results in unbalance of the bridge. During balance condition of the bridge 18 no voltage is available at the output terminals thereof, since equal voltage exists across both output terminals of the bridge at all instants of time. Upon unbalancing the bridge, however, output voltage becomes available, which is applied over the two wire line 21 to two contacts 22 and 23 of a mechanical commutator generally identified by the reference numeral 24.

The commutator 24 comprises a pair of movable ganged switch arms 25 and 26, which continually sweep over and wipe against the stationary contacts of the commutator 24, the arms 25 and 26 moving in synchronism, so that corresponding ones of the separate groups of stationary contacts of commutator 24 are contacted in pairs simultaneously, at all times. The switch arm 26 is grounded, while the switch arm 25 is connected with a lead 27, which constitutes an output lead for the commutator 24. Accordingly, when the switch arms 25 and 26 contact any pair of switch contacts, potential deriving from one of the strain gauges 18, 19, 20, and hence available across the leads 21, is applied between the lead 27 and ground.

The lead 27 leads to the control electrode 28 of an amplifier tube 29, the output of which is applied over line 30 to point 31 on the phase shifting network 8. I have selected the point 31 to be centrally located on the phase shifting network 8. However, in principle, the point 31 might have been selected at any other point on the network, the input end of the network alone being excepted, if the voltage on lines 7 and 30 be assumed in phase, or 180° out of phase. Accordingly, there are applied to the input control grid 12 of the amplifier tube 2, two alternating current voltages, of common frequency, but which are displaced in phase, since one of the voltages traverses the entire phase shifting network 8 while the remaining voltage traverses only a portion thereof, both voltages as originally applied being in phase, or 180° out of phase. Care must be taken in the design of the circuit to assure that the phase shift introduced by the amplifier 13, any strain gauge, and the amplifier 28, do not add up to a total phase shift for the voltage applied over the line 30 such as to cause the same to be substantially identical in phase with the voltage applied over the line 7, as measured at the point 31.

It will be evident that the voltage applied to the control electrode 12 is compounded of two separate alternating current voltages of the same frequency, but which are displaced in phase, and one of which is subject to variations in amplitude. If we assume that both alternating currents are of identical amplitude at a given instant, or for a given short period of time, the phase of the resultant voltage as applied to the control electrode 12 will be intermediate the phases of the two compounding voltages. As the amplitude of one of the compounding voltages, i. e., that one applied over the line 30, increases or decreases in amplitude from the assumed value, the phase of the compounded or resultant voltage will change, resulting in an effective shift of the total input voltage impressed on the grid 12. Such a shift results in a variation in the frequency of the oscillator 1, since the oscillator 1 continually adjusts its frequency such that the phase of the voltage output of the oscillator is precisely 180° displaced from the phase of the voltage existing at the control electrode 12. Accordingly, variations of amplitude of the voltage applied over the line 30 result in variations of frequency of the output of the oscillator 1.

Phase shift oscillators, of the character of oscillator 1, are peculiarly adapted for providing frequencies in the audio range, and up to approximately 100,000 cycles per second. The output of the oscillator 1 in the present system then may be utilized as a sub-carrier frequency, and is applied to a transmitter 31' for transmission thereby on a high frequency carrier wave, to a remote receiver.

As the contacts 25 and 26 are rotated slowly, as, for example, in response to actuation by a motor 32, the wiper arms 25 and 26 wipe over successive ones of the switch contacts of commutator 24 in pairs, successive pairs being thus connected with successive ones of the strain gauges 18, 19, 20, etc.

It will be clear from the description of my system that any desired number of strain gauges may be utilized in the practice of the invention, provided a pair of switch contacts is provided in the commutator 24 for connection to each of the strain gauges.

While the wiper arms 25 and 26 are not in contact with any of the switch contacts of commutator 24, and assuming that the switch contacts are so designed that times do exist when the wiper arms are not in contact with one or another of the switch contacts, the frequency of the oscillator will assume some value, determined by the fact that no voltage is available over the line 30. While the switch arms 24 and 25 are in contact with pairs of contacts of commutator 24, one or another of the strain gauges 18, 19, 20 will provide a voltage to the line 30, which will be reflected at the oscillator as a change of frequency. Accordingly, as the switch arms 24 and 25 rotate successive frequencies will be produced by the oscillator 1, which will be applied to the transmitter 31' for transmission as sub-carriers of the main high frequency carrier provided by the transmitter 31.

While I have indicated and described one specific system for carrying my invention into effect, it will be evident to those skilled in the art that my invention is by no means limited to the particular organization or embodiment of the invention which I have shown and described, but that various modifications may be made in my invention without departing from the true scope and spirit thereof.

What I claim and desire to secure by Letters Patent of the United States is:

1. In a frequency modulation system, an oscillator comprising an electronic vacuum amplifier tube having an anode and a control electrode, said oscillator oscillating normally at a frequency such that an alternating voltage at said anode is of opposite phase to an alternating voltage at said grid, first and second paths for applying a plurality of alternating voltages from said anode to said grid, said last mentioned alternating voltages being mutually phase displaced at said grid, and means for modulating the amplitude of one of said last mentioned voltages.

2. In a time division multiplex system, an electronic oscillator having a pair of electron discharge tubes having an input terminal connected to a control electrode of one of said electron discharge tubes and an output terminal connected with the other of such electron discharge tubes, an inductance-free regenerative feed back path between said output terminal and said input terminal for transferring voltage from said output terminal to said input terminal with a first predetermined phase shift, a plurality of selectively operative further regenerative feed back paths between said output terminal and said input terminal for transferring voltage to said input terminal each in a second predetermined phase, displaced from said first predetermined phase, each of said further regenerative feed back paths comprising a strain gauge for varying the amplitude of energy transferred via each of said further regenerative feed back paths, and means for rendering said feed back paths operative in time sequence.

3. In a frequency modulation system, the combination which comprises a pair of electron discharge tubes arranged in an inductance-free regenerative feed back circuit to produce oscillations at a predetermined frequency and at constant amplitude, a further regenerative feed back circuit at said predetermined frequency for said pair of electron discharge tubes, a strain gauge included in said further regenerative feed back circuit and connected to modulate the amplitude of signals passing in said further regenerative feed back circuit, and means responsive to the amplitude of signals in said further regenerative feed back circuits for deviating the frequency of said oscillations.

4. In a time division multiplex system wherein signals are transmitted in groups of successive pulses, each of said pulses corresponding with a channel of said time division multiplex system, means for determining the carrier frequency of said pulses comprising a pair of electron discharge tubes arranged in an inductance-free regenerative feed back circuit to produce said oscillations at a predetermined frequency and at constant amplitude, a plurality of further regenerative feed back circuits for said pair of electron discharge tubes, each of said further regenerative feed back circuits including a strain gauge for modulating the amplitude of signals fed back by said further regenerative feed back circuits, and means for connecting said further regenerative feed back circuits in succession to said pair of electron discharge tubes.

5. In a frequency modulation system, an amplifier comprising at least one electron discharge tube and having an input circuit and an output circuit, an inductance-free regenerative feed back circuit for applying signals at a first frequency from said output circuit to said input circuit in a first predetermined phase, a second feed back circuit for applying signals at said first frequency from said output circuit to said input circuit in a second and different predetermined phase, and means for modulating the amplitude of said signals in said second feed back circuit only.

6. In a frequency modulation system, a pair of electron discharge tubes, means coupling the output electrode of one of said tubes to an input electrode of the other of said tubes, said second tube including a cathode load consisting of a resistor network free of inductance, said load having an output connection to an input electrode of said first tube and functioning as a regenerative feed back path, a further feed back path between said output connection and said input electrode of said first tube, said further feed back path being arranged to provide feed back voltage in different phase at said input electrode of said first tube than does said first mentioned feed back path, and means for varying the amplitude of said feed back voltage in said second feed back path only for varying the frequency of said oscillator.

7. In a frequency modulation system, the combination which comprises a pair of electron discharge tubes having an input circuit and an output circuit, an inductance-free regenerative feed back circuit comprising an input terminal and an output terminal, means connecting said output circuit of said pair of electron discharge tubes to the input terminal of said feed back circuit and the output terminal of said feed back circuit to the input circuit of said pair of electron discharge tubes, a further feed back circuit between said output circuit and said input circuit of said pair of electron discharge tubes, said further feed back circuit comprising a strain gauge bridge having input terminals and output terminals, means for applying to said input terminals of said strain gauge bridge oscillations derived from the output circuit of said pair of electron discharge devices, means for deriving signal at the frequency of said oscillator from said output terminals of said strain gauge bridge, and means for applying signals deriving from said output terminals of said strain gauge bridge to a point intermediate said terminals of said first mentioned feed back circuit.

8. A frequency modulator comprising at least one electron tube having an input circuit and an output circuit, means comprising a phase shifting circuit for applying a first alternating voltage of a first frequency from said output circuit to said input circuit, said voltage having a first phase at said input circuit, a further feed back path for applying a second alternating voltage of said first frequency from said output circuit to said input circuit, said second voltage having a further and different phase at said input circuit, and means included in said further feed back path for varying the amplitude of said second alternating voltage only.

9. A frequency modulator comprising an oscillation generator having at least one electron tube, said at least one electron tube having an output electrode and an input electrode, said oscillator being adapted to oscillate at a frequency such that the phase relation between oscillation voltages at said output electrode and at said input electrode differ by 180°, a first feed back path between said output electrode and said input electrode for feeding oscillation voltage at a first frequency from said output electrode to said input electrode in a first predetermined phase, a second feed back path between said output electrode and said input electrode for feeding oscillation voltages at said first frequency from said output electrode to said input electrode in a second and different predetermined phase, and means included in said second feed back path for modulating the amplitude of said oscillation voltage traversing said second feed back path, whereby to vary the phase of the total voltage at said input circuit, and thereby the frequency of said oscillator.

ROBERT S. BUTTS.

REFERENCES CITED

The following references are of record in the file of this patent:

UNITED STATES PATENTS

| Number | Name | Date |
|---|---|---|
| 1,778,827 | Evans | Oct. 21, 1930 |
| 1,849,827 | FitzGerald | Mar. 15, 1932 |
| 2,085,418 | Crosby | June 29, 1937 |
| 2,238,249 | Crosby | Apr. 15, 1941 |
| 2,321,269 | Artzt | June 8, 1943 |
| 2,361,658 | Sinnett | Oct. 31, 1944 |
| 2,444,950 | Nichols et al. | July 13, 1948 |
| 2,459,557 | Usselman | Jan. 18, 1949 |